(No Model.) 6 Sheets—Sheet 1.
R. R. MOORE.
TRAVELING THRASHER.

No. 380,453. Patented Apr. 3, 1888.

Witnesses,
Geo. H. Strong.
J. H. Nourse.

Inventor,
Rufus R. Moore.
By Dewey & Co.
attys (No Model.)  R. R. MOORE.  6 Sheets—Sheet 3.
TRAVELING THRASHER.

No. 380,453.  Patented Apr. 3, 1888.

Witnesses,
Geo. H. Strong.
J. B. Nourse

Inventor,
Rufus R. Moore
By Dewey & Co.
attys (No Model.)
6 Sheets—Sheet 4.

R. R. MOORE.
TRAVELING THRASHER.

No. 380,453. Patented Apr. 3, 1888.

Witnesses,
Geo. H. Strong.
J. A. Nourse.

Inventor,
Rufus R. Moore
By Dewey & Co.
Atty (No Model.) 6 Sheets—Sheet 5.
R. R. MOORE.
TRAVELING THRASHER.
No. 380,453. Patented Apr. 3, 1888.
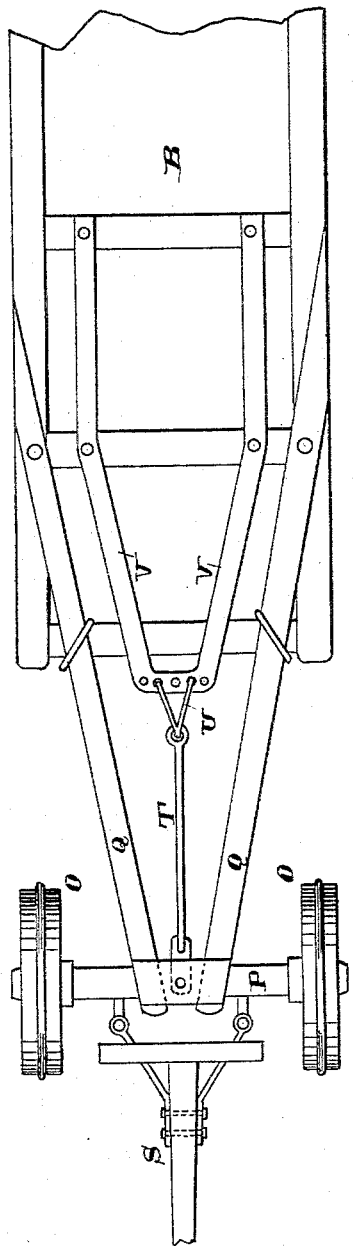
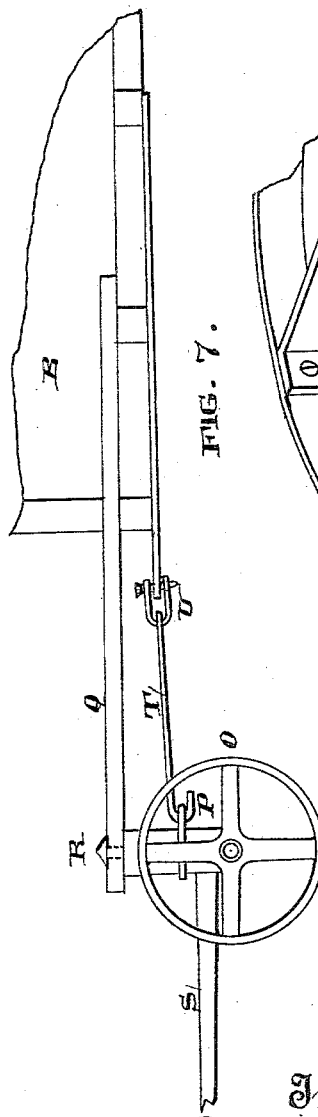
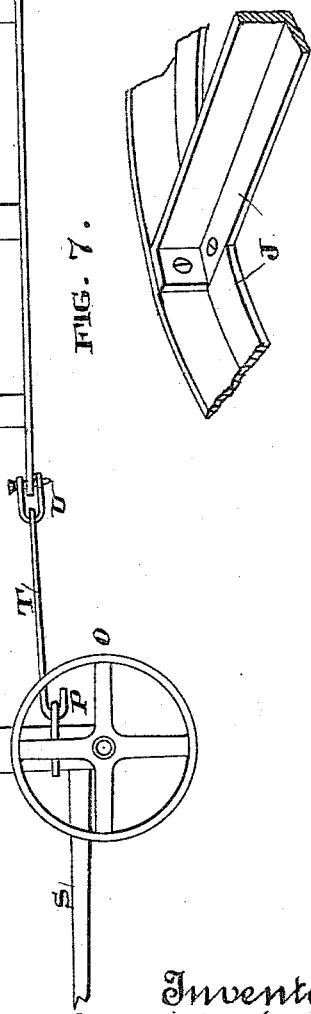
Witnesses,
Geo. H. Strong.
J. H. Nuise.
Inventor,
Rufus R. Moore.
By Dewey & Co.
Attys (No Model.) 6 Sheets—Sheet 6.
R. R. MOORE.
TRAVELING THRASHER.
No. 380,453. Patented Apr. 3, 1888.
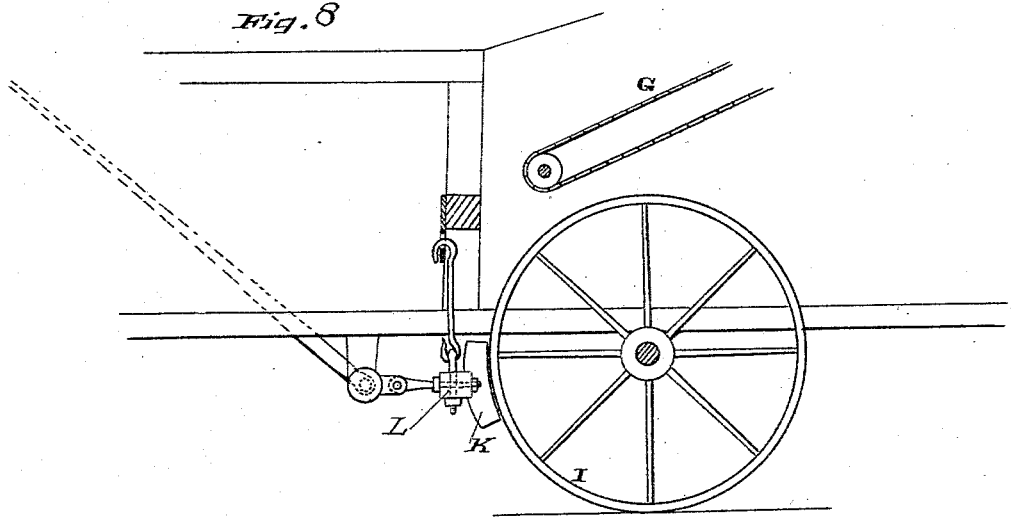
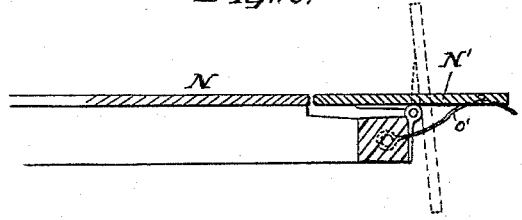
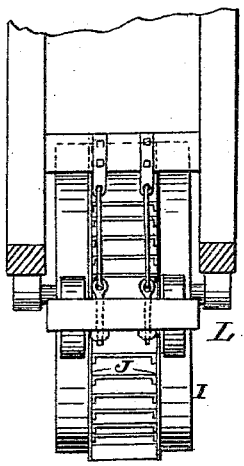
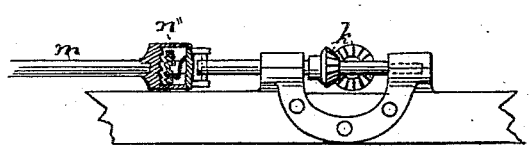
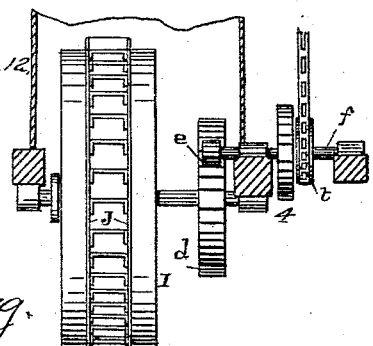

UNITED STATES PATENT OFFICE.

RUFUS R. MOORE, OF MODESTO, CALIFORNIA.

TRAVELING THRASHER.

SPECIFICATION forming part of Letters Patent No. 380,453, dated April 3, 1888.

Application filed April 19, 1886. Serial No. 199,421. (No model.)

*To all whom it may concern:*

Be it known that I, RUFUS R. MOORE, of Modesto, county of Stanislaus, State of California, have invented an Improvement in Traveling Thrashers; and I hereby declare the following to be a full, clear, and exact description of the same.

My invention relates to a machine for thrashing and separating or cleaning grain, said machine being constructed to travel about the field, and having a receiving-table and carrying-belts, from which the grain is delivered directly from the spout of an independently-driven header which travels by its side. These receiving and carrying belts deliver the grain to the thrashing and separating mechanism, and the whole is driven directly from a central traction and bearing wheel placed beneath the machine and nearly or quite in line with the draft-pole. In combination with this is a train of gearing driven directly from this shaft and means for disconnecting the thrashing-cylinder and feeding-belt from this gearing. A mechanism is also employed for connecting and disconnecting the wheel itself from the bearing-axle, means for applying a brake to its periphery, means for adjusting and strengthening the frame of the centrally-supported machine, and other details of construction, all of which will be more fully explained by reference to the accompanying drawings, in which—

Figure 1:
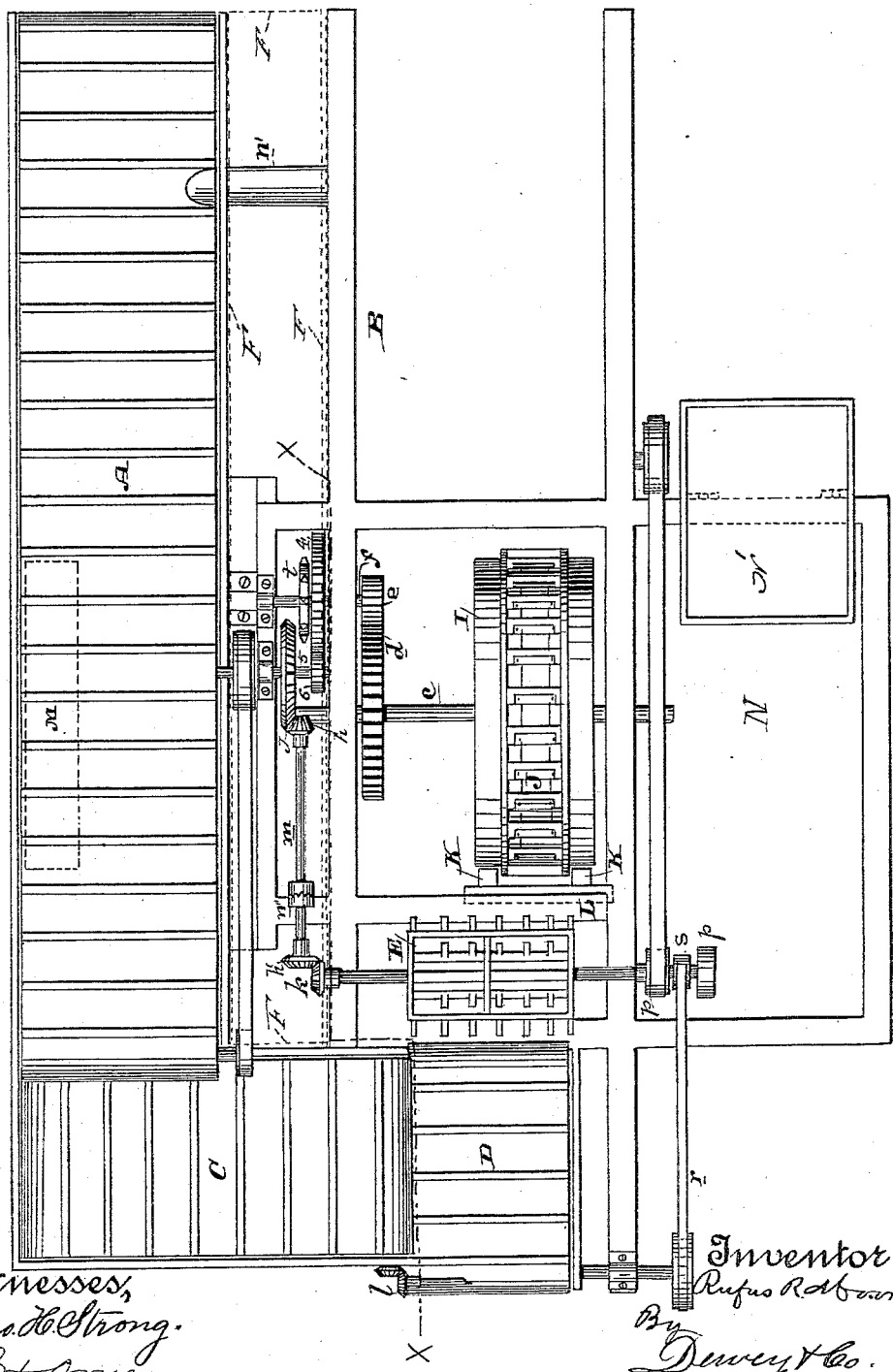
Figure 2:
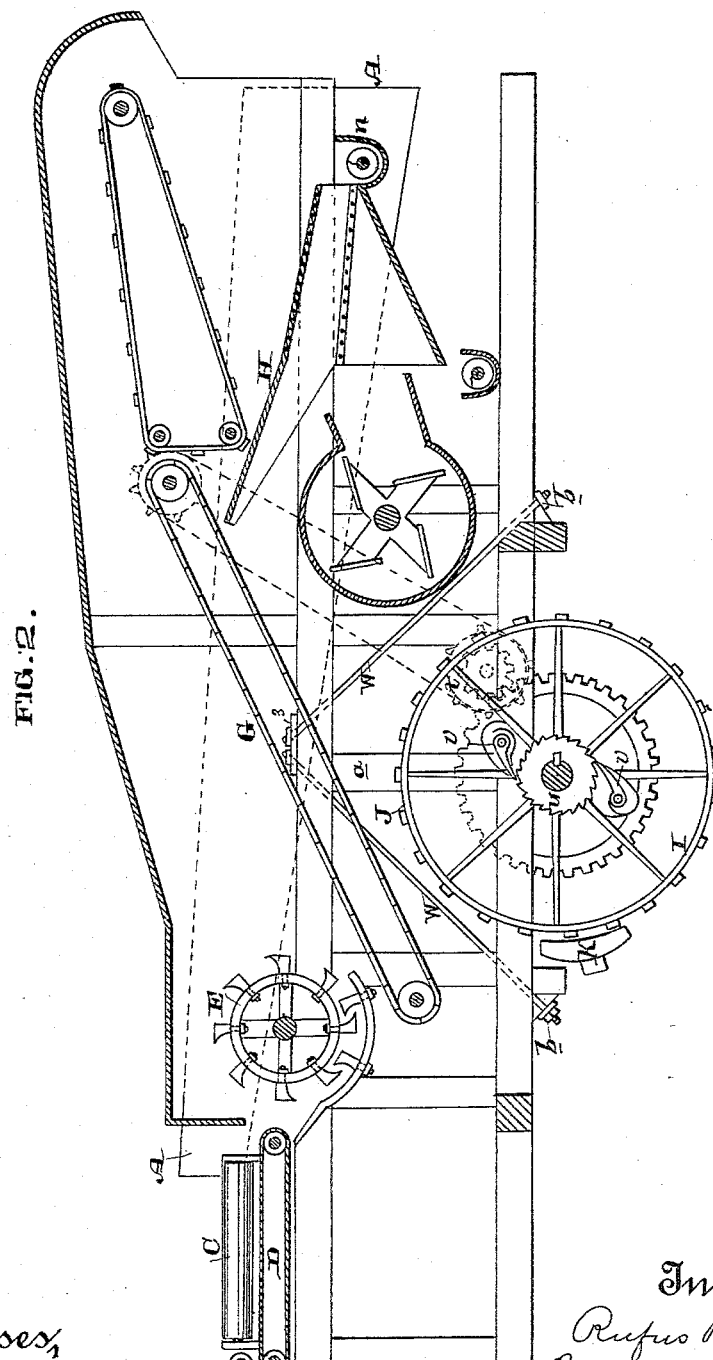
Figure 3:
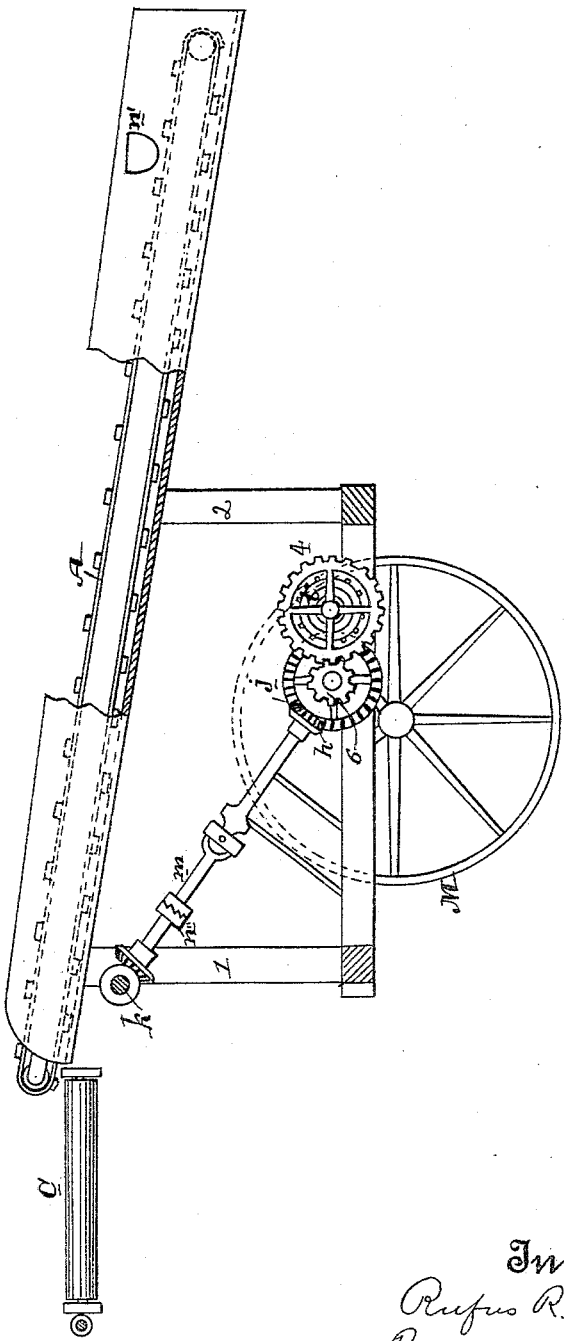
Figure 4:
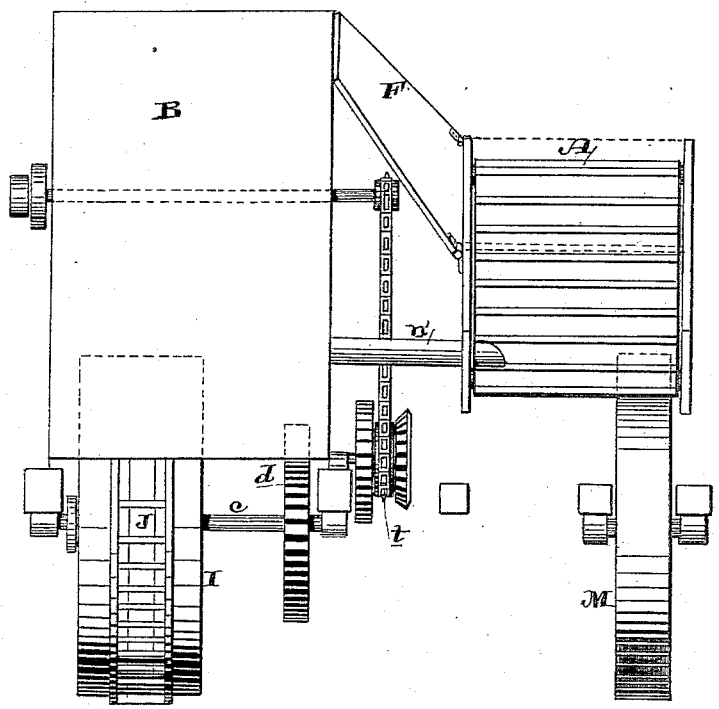

Figure 1 is the top or plan view of the machine with the central portion of the thrashing and cleaning mechanism removed to show the bearing-wheel and gearing, showing, also, the receiving and supply belts and the thrashing-cylinder. Fig. 2 is a longitudinal vertical section taken through the thrashing and cleaning mechanism, showing, also, the main bearing-wheel and truss-supports for the frame. Fig. 3 is a section on line *x x* of Fig. 1, taken from the side nearest the header, showing the longitudinal receiving and carrying belt, the driving mechanism for the cylinder, and the transverse feed-belt. Fig. 4 is a rear end view of the machine. Fig. 5 is a bottom view of the forward part of the front wheels and draft mechanism. Fig. 6 is a side elevation of the same. Fig. 7 is a detail view of a small portion of the main wheel. Figs. 8 and 9 are detail views showing the manner in which the brake-blocks are supported. Fig. 10 is a detail view showing the sacking-platform. Fig. 11 shows in detail the clutch-connection between the traction-wheel and the shaft of the cylinder E, and Fig. 12 is a detail showing a part of the gearing which communicates the power from the traction-wheel.

In order to divide the work to be done and the team necessary for the work, I have found it preferable to employ a thrashing-machine and a header drawn independently by separate teams of horses, and in order to deliver the unthrashed straw from the header to the thrashing-machine I employ a series of receiving and carrying belts supported and driven from the thrasher, and by which the straw is received from the header-spout and transferred to the cylinder.

A is the carrying belt or table, extending along parallel with one side of the thrashing-machine B, from the frame of which it is supported, as at 1 and 2, Fig. 3, so as to stand parallel with the line of movement of the machine. This belt is preferably inclined from the rear end toward the front, where it discharges upon another belt, C, which travels transversely in a horizontal plane and delivers the straw upon the feeding-belt D, from which it passes to the thrashing-cylinder E. The inclination of the belt A is such that the rear end will be somewhat lower than the tailings-auger *n* at the rear of the cleaning-shoe, as in Fig. 2, and by continuing this auger and the spout *n'* through the side of the separator and above the belt A, as in Figs. 1, 2, and 3, the unthrashed heads and material which it is desirable to again pass through the machine will be carried to the cylinder without the employment of a separate and independent tailings-elevator. The grain is cut in the usual manner, and is then delivered upon the traveling belt or table A of the thrashing-machine. The two machines are driven with such relation to each other that the delivery-spout of the harvester hangs slightly over the carrying-belt A, and it will be manifest from the length of this belt that the relative positions of the machines may change considerably and that the straw from the harvester may be delivered to any part of the carrying-belt A from one end to the other without interfering with its constant and regular delivery to the thrashing-cylinder.

F is an inclined board or screen of considerable width, which is hinged along the inner edge of the frame of the carrying-belt A, and its upper edge rests against the sides of the thrasher B, so as to prevent the straw from the header-spout being discharged over and beyond the belt A by reason of wind or of any carelessness in driving the two machines. (See dotted lines, Fig. 1, and full lines, Fig. 4.) This board may be swung over so as to lie above the belt A and allow free access to the mechanism between the belt and the side of the machine when desired, and when the machine is left at night or during a rain it will serve as a roof or cover to protect and keep the moisture off the belt A. The thrashed grain and the straw pass from the cylinder E upon the inclined carrying-belt G, and from this the straw passes over a straw-carrier of the usual description, while the grain is carried by a direction-board, H, into the cleaning-shoe, these parts not differing materially from those shown in the ordinary thrashing-machines.

In order to provide sufficient tractile force to drive the machinery of the thrasher and cleaner, I have found it necessary to concentrate the greater part of the weight of the machine upon a single bearing and driving wheel. This wheel I is mounted loosely upon a shaft, c, so as to stand between the side timbers of the main frame beneath the grain-belt G, and so as to stand nearly or quite in line behind the draft-pole of the machine. The wheel may be moved along upon the axle until it is adjusted to the proper point to properly balance the machine, and may then be fixed at that point so as to remain there. The wheel is connected or disconnected from the axle by means of a ratchet-wheel, u, secured to the shaft, and pawls v, mounted on a web formed between the spokes of the wheel, so that when at work this wheel may be connected with the axle rigidly to drive the gearing and mechanism, but when traveling from place to place by disconnecting the pawls the wheel will revolve loosely and without driving the machinery, which is desirable, as it saves wear to the machinery and reduces the draft.

The wheel I has a broad face, which assists materially in supporting the machine in loose or sandy soil, and it has projecting lugs or corrugations, as in Fig. 7, around its central portion, which will take a firm hold of the ground and prevent the wheel from slipping. These corrugations or lugs do not extend across the whole surface of the wheel, but have flanges or rims which surround the wheel at some distance from the edges thereof, which construction admits of the application of brake-blocks K, which fit upon the smooth portion of the rim of the wheel upon each side of the corrugated central portion, J, and they are attached to the brake bar or beam L, the said beam being suspended by rods, as shown in Figs. 8 and 9, from the frame. The brake is operated by a suitable lever (not shown) extending to a point within reach of the driver.

A wheel, M, is mounted upon a separate axle beneath that portion of the frame which supports the carrying-belt A. This wheel is not intended to support any very great portion of the weight of the machine, but simply serves to steady it and prevent its tipping over in that direction.

N is a platform projecting from the side of the machine opposite to that upon which the receiving-belt is located, and is adapted to receive the sacks and to hold them while they are being filled. At one end of this platform is a tilting board, N', pivoted to the end of the beam and extending beyond the edge of the same, with a spring, o', for holding it in a horizontal position. As the operator places the filled sacks upon this platform, it tilts under the weight and dumps the filled sack upon the ground, the spring returning the board to its normal position.

As the wheel I stands nearly centrally beneath the machine, the principal portion of the weight of the machine is borne by this single wheel, which thus serves as a fulcrum, upon which the weight of the platform N acts like a lever, thus increasing the tractile power of said wheel.

The forward end of the machine is supported by small wheels O, the axle P of which is connected with the front end of the frame-timbers Q by a king-bolt, R, which passes down through the bolster and the axle, as shown in Figs. 5 and 6.

The pole S is connected with the axle P, to which the draft is applied by the team through the medium of the pole.

In order to steady the front of the machine and apply the draft directly to it, a stout rod or link, T, extends backward from the axle, being connected with it by means of the plate through which the king-bolt passes and to which the rod is connected. This rod is connected by a clevis, U, with the front of a stout iron strap, V, which is secured beneath the frame-timbers at the front part of the thrashing-machine B. Holes are made in the front of the transverse plate V, into which the clevis may be moved, so as to change the draft from one side to the other. By this construction it will be seen that the king-bolt R and the axle and bolster are relieved from the strain and irregularities of the draft, by reason of which the connecting rod or link T is applied directly to the front of the frame-work of the machine. The weight of the machine is so accurately distributed that but a very small portion of it is brought upon the front or guiding wheels, O, and as the connecting draft-rod T has an inclination downward from the front of the machine to the axle of these wheels the downward draft will act to pull the front of the machine downward, and thus, while these wheels rest very lightly upon the ground, they will be kept down by the action of the draft and prevented from jumping or rising from the ground.

The main bearing-wheel I, being set between the side timbers of the frame beneath the thrasher, has a suitable space within which to turn, and in order to properly support the framework and prevent it from becoming twisted by irregular strain I employ truss-rods W, the lower ends of which pass through the framework upon each side and the upper ends approach each other, as shown in Fig. 2, passing through the timbers above the wheels, and being held in place by an iron plate, 3, with holes to receive the rods. The vertical posts *a* have their feet or lower ends resting upon the lower timbers of the machine directly over the bearing-axle and the upper ends against the upper timbers and beneath the point where the heads of the truss-rods W are supported. Nuts *b* are fitted upon the lower ends of these diverging rods W, and it will be seen that, when desired, tension may be brought upon the rods by screwing up these nuts. The whole weight of the machine is thus practically supported by the single wheel I, and by means of these rods the outer ends of the machine are prevented from sagging and all portions of it are kept in a straight line, so that the boxes will not get out of line, all unnecessary friction being avoided by this adjustment. The axle *c* of the wheel I has a spur-gear, *d*, fixed to it, meshing with the pinion *e* upon the shaft *f*, and this shaft carries a gear-wheel, 4, engaging a pinion, 6, upon another shaft, 5, and by means of the beveled gears *j* and *h* and an intermediate shaft, *m*, power is communicated to drive the thrashing-cylinder E at the proper rate of speed.

Upon the outer end of the thrashing-cylinder shaft are pulleys *p*, which carry belts to drive the separating and cleaning portions of the machine. The feed-belt D, which delivers the unthrashed straw to the cylinder, is driven by the belt *r* from the pulley *s*, and power is transmitted from the shaft at the outer end of this feed-belt by means of a beveled gear, *l*, to drive the belt C. The receiving and carrying belt A is driven directly from the mechanism connected with the axle *c* of the driving-wheel I and moves and stops simultaneously with this axle.

The rate of speed which must be given to the thrashing-cylinder to do effective work should be about nine hundred revolutions per minute, and the gearing heretofore described is calculated to produce about this speed with the ordinary rate of travel of a team. It is manifest, however, that the machinery is liable to be checked from time to time by the wheel falling into depressions or furrows in the land, which temporarily stop it, or it may be temporarily caused to run slower by various causes, such as turning corners, &c. It is, however, necessary that the speed still be kept up in order to thrash thoroughly and prevent choking, and the weight of the cylinder is sufficient so that, if not otherwise checked, it will keep up its rate of speed for a considerable length of time. In order, therefore, to allow the cylinder to continue its speed after the remainder of the machinery has become checked, I have divided the shaft *m*, which carries the beveled gears *j*, and a clutch mechanism is formed in it at *n''*. (Shown in Figs. 1, 3, and 11.) This mechanism may be of any well-known form which will allow the shaft to be driven as a whole in one direction; but if the portion of the shaft nearest the gearing *j* becomes checked in any way the two parts of the clutch will move over each other, so as to allow the beveled gear *h* and the cylinder to continue their high rate of speed without reference to the slower motion of the remainder of the machinery. As the belts C and D are also driven by direct connection with the cylinder, it will be seen that these will also continue their motion, so that in case of the entire stoppage of the machine whatever straw may be at the time upon these belts will be carried into the cylinder of the thrasher and discharged therefrom before the cylinder stops, thus leaving it entirely clear and ready to commence its motion again before any straw will reach it from the belt A. This belt A, being, as before described, connected directly with the driving-gearing from the axle of the main wheel I, will stop simultaneously with the gearing, and therefore will not deliver any more straw upon the belts D and C after the machine is stopped until it is again set in motion. It is also necessary to stop the grain and straw carrying belt G, which delivers from the cylinder to the cleaning-shoe, in order to prevent the clogging of the latter, and this is effected by driving the belt G by means of a belt or chain from the sprocket-wheel *t* upon the shaft *f*, as shown in Fig. 2, which is driven directly from the main bearing-axle, as before described. By this construction the belt G and the receiving-belt A are directly dependent upon the main bearing-wheel for their motion, while the feed-belts C and D and the cleaning-mechanism derive their movement from the thrashing-cylinder shaft, and as this becomes disconnected from the other mechanism upon the stoppage of the latter, it will be seen that the cylinder and the cleaning mechanism will continue their motion by momentum until they are clear of straw and grain. This allows the cylinder to start up unobstructed when power is again applied, thus avoiding all danger of breakage from a clogged cylinder. In my construction I have placed the clutch mechanism *n* so close to the thrashing-cylinder that there is practically little friction to be overcome, except the movement of the cylinder on its journals and the driving of the two belts which are connected with it, so that my machine will practically produce the intended result.

The matter shown herein but not claimed constitutes the subject-matter of another application, filed by me in the United States Patent Office September 24, 1885, No. 178,099.

Having thus described my invention, what I claim as new, and desire to secure by Letters Patent, is—

1. In combination, the frame, the bearing-wheel, the grain-carrying belt A, driven from the bearing-wheel, the belt C, the feeding-belt D, adapted to convey the material from the belt C to the thrashing-cylinder, and intermediate mechanism consisting of shafts and pulleys connected directly with the shaft of the thrashing-cylinder for driving the belt C and the feeding-belt D independent of belt A, substantially as described.

2. In combination, the frame, the cylinder, and receiving-belt A, the transverse belt C, and feeding-belt for delivering the material to the thrashing-cylinder, and mechanism, consisting of shafts, gear-wheels, and pulleys, driven directly from the main bearing and traction wheel of the machine, whereby the receiving-belt stops and moves in unison with the movement of the main bearing-wheel, while the transverse belt, thrashing-cylinder, and feeding-belt move in unison and independently of the movement of the receiving-belt and bearing-wheel of the machine, substantially as described.

3. The combination of bearing-wheels, an axle, the separator-frame constructed with upper and lower horizontal beams and vertical posts between them, one being located directly above the axle, the diagonal truss-rods connecting the lower beam with the upper beam at a point above the axle, and tightening-nuts whereby the frame-work is kept from sagging on either side of its line-support, substantially as described.

4. The thrashing-cylinder E, the driving-wheels, the driving-gear $k$, the jointed shaft $m$, and the clutch $n''$, adapted to transmit rotation in one direction only from one portion of said shaft to the other, in combination with a feeding-belt, the carrying-belt supplying straw thereto, the cleaning mechanism, and the gearing whereby the said feeding and carrying belt and cleaning mechanism are driven directly from the cylinder-shaft and in unison therewith, substantially as described.

5. In combination with the receiving-belt, arranged parallel with the side of the thrasher and separator, and a belt adapted to receive straw therefrom, the separator-frame and the hinged wind board or fender F, extending from the inner edge from end to end of the carrying-belt to the side of the separator-frame, substantially as described.

6. The combination, in a thrasher and separator, of the forward guiding and supporting wheels, O, the bolster, and the axle, a king-bolt passing through the bolster and the axle of said wheels, the draft-pole S, the draft-rod T, extending forward from the axle, and a clevis and metallic plate or frame whereby the said draft-rod is connected directly with the front of the machine, substantially as described.

7. The bearing-wheel mounted upon an axle and having a portion of its periphery corrugated or roughened and the remainder made smooth, and the thrasher and separator frame, within which the axle of the wheel is journaled, in combination with the brakes K, suspended from the separator-frame and so formed as to press upon the smooth periphery of the wheel only, substantially as described.

8. The thrashing-machine having the separating mechanism contained within it, a bearing-wheel adapted to support the machine, and a train of gearing driven therefrom, in combination with the receiving traveling belt supported at an inclination and parallel with the side of the frame of the separator, and a tailings-conveyer extending from the rear of the cleaning-shoe directly to the carrying-belt, so as to deliver its contents thereon, substantially as described.

In witness whereof I have hereunto set my hand.

RUFUS R. MOORE.

Witnesses:
L. J. MADDUX,
J. C. SEMPLE.